No. 705,745. Patented July 29, 1902.
J. FLIEGEL.
APPARATUS FOR HEATING LIQUIDS.
(Application filed Aug. 22, 1901.)
(No Model.)
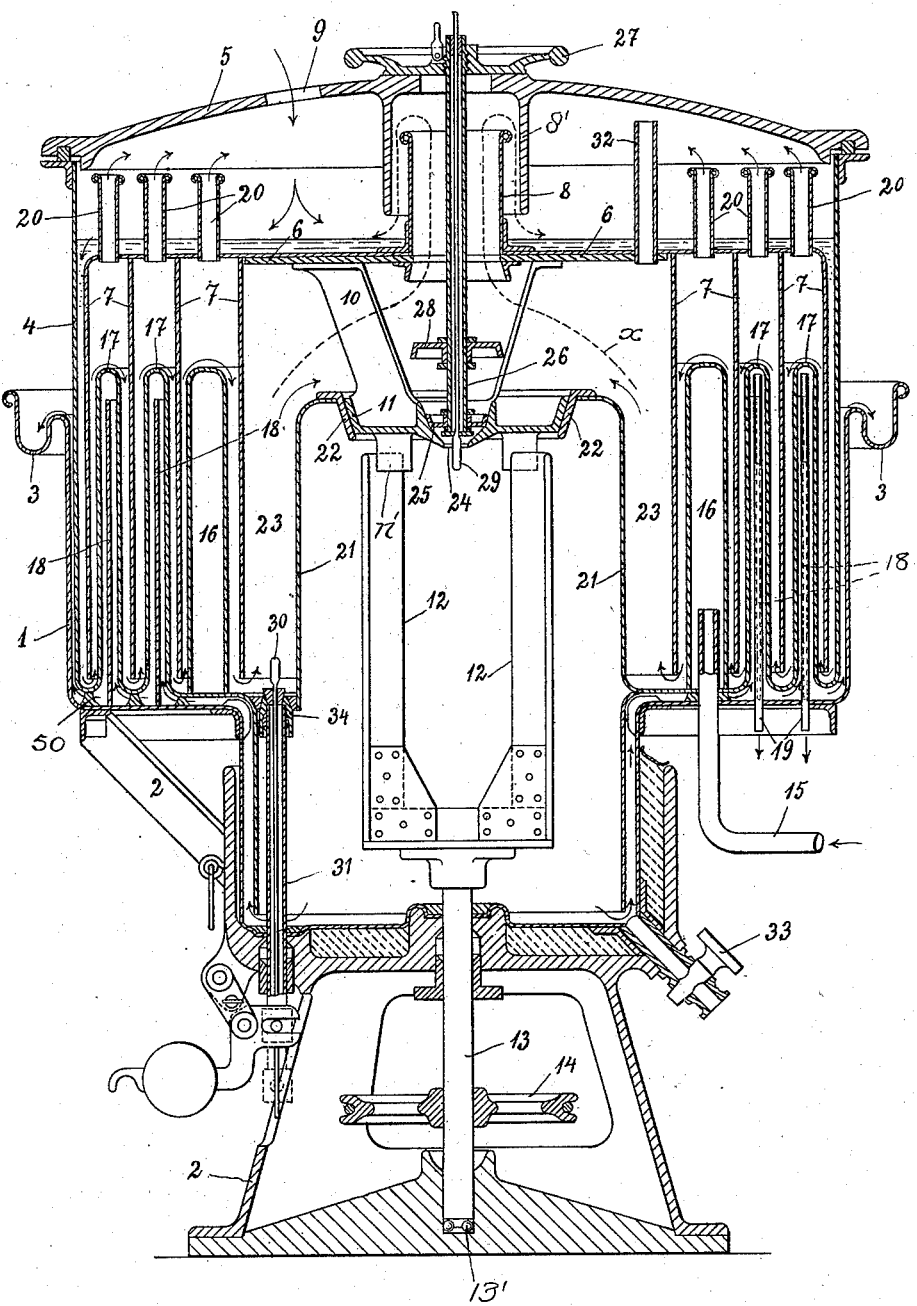
WITNESSES:
Isabella Waldron
Adelaide E. Gleason
INVENTOR
Josef Fliegel
BY
Richardson
ATTORNEYS.

UNITED STATES PATENT OFFICE.

JOSEF FLIEGEL, OF MALLMITZ, GERMANY.

APPARATUS FOR HEATING LIQUIDS.

SPECIFICATION forming part of Letters Patent No. 705,745, dated July 29, 1902.

Application filed August 22, 1901. Serial No. 72,909. (No model.)

*To all whom it may concern:*

Be it known that I, JOSEF FLIEGEL, manufacturer, a subject of the German Emperor, and a resident of Sprottauer Chaussée, Mallmitz, in the Empire of Germany, have invented a certain new and useful Improved Apparatus for Heating Liquids, Especially Milk, of which the following is a clear, full, and exact description.

The invention relates to improvements in such apparatus for heating liquids, especially milk, to a germ-destroying temperature, according to which the liquid to be heated flows through a series of chambers.

The invention has for its object to effect a thorough mixture of the liquid to be heated, and thereby a uniform heating of the same; also, to prevent the liquid contained in the apparatus from coming in contact with the external air in order to avoid loss of heat and a renewed infection of the liquid by micro-organisms. In known apparatus of the said kind the liquid is either passed without pressure through outwardly-opening chambers or the heating-chambers are closed and the liquid pressed through the same by means of a pressure-pump. Both kinds of apparatus show material disadvantages. In apparatus having closed heating-chambers a thorough mixture of the liquid is prevented by the pressure necessary for feeding the liquid through the said chambers. The liquid completely fills up the chambers through which it passes and flows into a closed column through these chambers, so that movements causing the mixture cannot take place within the liquid; but the particles of liquid coming in direct contact with the walls of the heating-chambers become more heated than the other particles, thus easily causing the liquid to become overheated, and consequently slightly burned, whereby especially milk receives a disagreeable taste. In apparatus having open heating-chambers the contact with the external air, however, causes a detrimental cooling of the liquid and the danger of a renewed infection.

In order to avoid the drawbacks which are present in connection with known apparatus, the present invention contains the arrangement of an outwardly-closed inflow-chamber, which is only provided with an inlet socket-piece whose cross-section can be so proportioned that the liquid can pass into the apparatus without allowing of the admission of external air into the apparatus to a considerable extent. In order to prevent a pressure of the liquid in the heating-chambers, each of these chambers is provided with one or more air-exhaust channels, whereby the waste steam of the heated liquid can escape without the external air entering the apparatus. By discharging the waste steam the liquid need not completely fill up the chambers through which it passes, so that there are free spaces which allow of a separation and a thorough mixture of the liquid.

A further part of the invention consists therein that the air-exhaust channels in which the heating of the liquid takes place lead into a chamber—for instance, the inflow-chamber—located in front of the aforesaid chambers, thus enabling the waste steam of the heated liquid to be utilized for preliminary heating. These air-exhaust channels are preferably so provided that the already-heated liquid cannot mix with the less heated liquid.

A further development of the invention is the arrangement of a collecting-chamber in which the heated liquid enters after it has passed through the heating-chambers and from which the hot liquid can be discharged through a cock or the like without mixing with the non-heated liquid.

The combinations of the invention are shown in the drawing by way of example.

The apparatus shown is so arranged that the liquid to be heated flows through the apparatus in an opposite direction to the heated liquid.

The figure in the accompanying drawing shows the apparatus in a longitudinal section.

The apparatus consists of an outer cylindrical vessel 1, which is rigidly mounted on a bottom frame 2 and provided with an overflow-channel 3, passing around the same. Within the vessel 1 is provided a cylinder 4, which is mounted by blocks 50 upon the cylinder 1 and covered by an upper lid 5. In the vessel 4 is provided a rotating agitator, which consists of an upper plate 6 and downwardly-directed concentric annular pieces 7, rigidly connected with such plate, these annular pieces 7 forming annular chambers. A tube 8 of the plate 6 loosely passes into a tubular piece 8' of the cover 5, through whose aperture or slot 9 the feed of the milk to be heated is effected in a suitable manner. The object of the tubular pieces 8 and 8' is that through the same the vapors produced in the milk escape in the direction of the dotted lines $x$ into the milk admission or inlet chamber. The agitator is connected by a support 10, having a lower ring 11, to a bifurcated arm 12, whose shaft 13, with ball step-bearing 13', is driven by a rope pulley 14 or in any other suitable manner, so that the agitator is also rotated thereby. The agitator is connected to the support 10 in such a manner that the ends of the bifurcated arm 12 engage behind two projections 11' in the rotating direction of the valve 11 or support 12, and thus take with them the support 10 and also the agitator 6.

Between the annular pieces 7 is provided in the inner annular chamber a steam-heating body 16, communicating with the steam supply or inlet pipe 15 and toward the exterior chambers 17, with lower free communication for allowing of the heated milk and milk to be heated to flow in opposite directions through the apparatus, which is effected by the annular pieces 18 of the vessel 1 in a manner to be more fully explained later on. Air-exhaust pipes 19 open above and below and, extending through the bottom of the vessel 1, communicate with the chambers 17. There are also provided in the upper plate 6 of the agitator, between the annular pieces 7, pipes 20 for discharging the vapors. The pipes 19 and 20 are so high that the milk passing through or fed into the apparaus cannot pass into these pipes.

The pipes 20 are provided so that the vapors can issue from the chambers 7 without milk passing therein, which does not take place, because the milk poured through 9 lies quite flat on the bottom. The pipes 19 are arranged at such a height that their outlet is not reached by the milk contained in the vessel 17 and passing over the part 18, while vapors pass freely from 17 through the pipes 19. Of these pipes 19 so many are provided as required for conducting the vapors from the milk. In the present case only those on the right side are indicated in the drawing for the sake of clearness, while those on the left side are omitted. They are fixed in the annular pieces 18.

The interior of the apparatus is formed by a collecting-chamber 21, whose upper ring 22 receives the conical ring 11 of the support 10 of the agitator and is open toward the bottom to admit of a return of the heated milk in an opposite direction to the flow of the milk to be heated in the apparatus. The admission of the milk from the heating-chamber 23, surrounding the collecting-chamber in the upper part laterally and above, is effected through a comparatively narrow opening 24 in the disk of the ring 11, which affords a seat for a valve 25 of a hollow spindle 26, operated by a hand-wheel 27, whereas the second valve 28 on opening the valve 25 shuts off the socket 8 of the plate 6 of the agitator. The hand-wheel and also the spindle 26 are provided with suitable threads whereby when turning the hand-wheel the spindle 26 is raised with the valves 25 and 28. The valves 25 and 28 are rigidly fixed. If the spindle 26 is screwed downward, the valve 25 shuts off the admission of the milk to the receiver, whereby according as this valve is adjusted lower the circulation of milk to the receiver is regulated. If the spindle 26 is screwed upward, the valve 28 shuts off the pipe 8 to the milk-chamber, whereby by means of pipe 32 air is pumped out of the milk-chamber, or the milk which is still contained in the apparatus after the pipes 20 and 19 are plugged is pumped out through pipe 32, whereby all the milk can be discharged from the apparatus. In the tubular spindle 26 is inserted a thermometer 29, whereby the average temperature of the heated milk fed to the collecting-chamber 21 can be ascertained. In the same manner the heating-chamber 23 is accessible through a pipe 31, introduced from below and containing a thermometer 30.

The milk-heating apparatus operates as follows: By means of a milk-pump or a collecting vessel the milk to be heated is fed through the aperture 9 of the lid 5 to the apparatus and passes to the top 6 of the agitator. From this cover the milk is fed in the direction of the arrows indicated by full lines to the separate heating-chambers 17 between the annular pieces of the agitator and the fixed vessel 1 and finally to the steam-heating body 16. The milk then enters the wide heating-chamber 23, which surrounds the central collecting-chamber 21 laterally and above, in order to rush, after opening the thermometer-valve 25, through the comparatively narrow opening 24 into the collecting-chamber 21. Consequently a thorough mixture of the heated milk takes place, so that the average temperature can be ascertained with certainty. The mixture is all the more complete, as the milk issues into the collecting-chamber without being subjected to pressure. The milk remains in the collecting-chamber 21 for a sufficiently long period so as to be thoroughly sterilized by the action of the heating-body 16. Furthermore, this collecting-chamber and the heating of the milk therein allow of a heating temperature below boiling-point—namely, below 100° centigrade—to be observed, since the germ-destroying action in connection with infectious diseases, such as flags and blackleg, is already attained at 80° heat maintained for about ten minutes. By this method of heating the milk the boiling taste of the sterilized milk, which is so detrimental to the milk trade and the making of butter, is avoided. The proper sterilization of the milk is especially insured on account of the fact that the heated milk in the collecting-chamber 21 is protected against cooling down and can therefore be maintained at a high temperature for a certain length of time. The driving-fork 12 for the agitator serves at the same time for the further continuous mixture of the milk in the collecting-chamber, so that an absolutely-uniform temperature of the milk can be relied upon and an overheating by the heating-body is prevented. The sterilized milk passes from the collecting-chamber 21 in an opposite direction to the incoming milk into the separate chambers 17, gives off its heat to the fed milk to be heated in order to pass out of the vessel 1 above in a considerably-cooled state and to enter the overflow-channel 3 of the same. The milk is not discharged from the apparatus through piping, as in connection with known apparatus; but for avoiding any pressure it passes into an overflow-channel above at the edge of the vessel 1, from whence it is fed through a delivery-channel to the cooler, centrifugal apparatus, or the like. (Not shown.)

The possibility of easily and conveniently cleaning all parts of such apparatus is insured by the fact that the cover or lid 5 can be readily removed by a winch or the like. The agitator can be taken out in the same manner, and the cylinder 4 can also be removed for uncovering the cylinder 1, with its annular pieces 18, after loosening the connections for the steam and waste-water pipe.

A material advantage of the apparatus consists in the fact that the entire milk contained in the vessel 1 is sterilized, so that after taking the apparatus to pieces the milk is ready for use, while in connection with known constructions the milk still contained in the apparatus is considered as insufficiently sterilized on account of mixing the heated with the non-heated milk when the apparatus is not working. Furthermore, it is of moment that all of the milk contained in the vessel 4 is sufficiently heated and that at the end of the process no milk remains which has not reached the necessary temperature and been maintained at such temperature for a sufficiently long period. For this purpose a pipe 32 is provided at the top 6 of the agitator. If the last portion of fresh milk has been passed into the apparatus, milk will remain behind in the lateral chambers 17, according to the principle of communicating pipes, which is not yet heated and does also not flow further. After the cover or lid 5 of the apparatus has been removed, the pipe 32 is put into communication with an air-pump and the mechanism of the agitator previously thrown out of gear. The air-exhaust pipes 20 are tightly closed by plugs and the valve 28 of the thermometer-pipe 26 fixed against the lower edge of the socket 8 by the hand-wheel 27 for shutting off the former. If the air-pump is now operated, the milk contained in the lateral chambers 17 will be sucked or drawn toward the middle of the apparatus. The collecting-chamber 21, which before the suction through the air-pump has been emptied by the discharge-cock 33, whereby the milk issuing from the cock can be passed directly upon the cooler, is provided at the pipe 31 with a valve 34. If this valve is opened before the suction takes place, the milk passes from the chamber 17, after being fed over the heating-body 16 and heated by the same, into the collecting-chamber 21 and remains therein until it is sterilized. This milk can also be discharged through the cock 33. In this manner it is possible to properly sterilize the very last portion of milk contained in the apparatus.

Having now particularly described and ascertained the nature of the said invention, I declare that what I claim, and wish to secure by Letters Patent, is—

1. In combination, an outer vessel 1 having the annular pieces 18 extending up therefrom, a cylinder 4 extending down into the vessel 1 and having chambers 17, the walls of which fit over the annular pieces 18, an agitator having downwardly-extending annular pieces 7 extending between the walls of the chambers 17, a heating-body 16, a centrally-arranged receiving-chamber 21 connected with the passages formed between the walls of the chambers 17 and the depending pieces 7 of the agitator, said receiving-chamber having an outlet connecting with the passage formed between the walls of the chambers 17 and the annular pieces 18 of the vessel 1, said agitator having a horizontal diaphragm or top whereby the milk is directed to the passage between the chambers 17 and the agitator, the said vessel 1 having an outlet for the milk and means for rotating the agitator, substantially as described.

2. In combination with the vessel 1 having the annular upwardly-extending pieces 18, a cylinder 4 having the annular chambers 17, the walls of which fit over the annular pieces 18 to form a circuitous milk-passage, agitator means and air-exhaust pipes 19 open at a point above the upper edge of the pieces 18 within the said circuitous passage, substantially as described.

In witness whereof I have hereunto set my hand in presence of two witnesses.

JOSEF FLIEGEL.

Witnesses:
CARL ZOSEL,
HERMANN BARTSCH.